United States Patent
Yule et al.

(10) Patent No.: US 8,248,487 B2
(45) Date of Patent: Aug. 21, 2012

(54) METHOD OF CREATING AN IMAGE FILE WITH COMBINED IMAGE DATA AND RAW GPS DATA AND A DIGITAL CAMERA FOR THE SAME

(75) Inventors: Andrew T. Yule, East Grinstead (GB); Johan Peeters, Bierbeek (BE); Christopher B. Marshall, West Susssex (GB)

(73) Assignee: U-BLOX AG, Thalwil (CH)

( * ) Notice: Subject to any disclaimer, the term of this patent is extended or adjusted under 35 U.S.C. 154(b) by 641 days.

(21) Appl. No.: 12/224,353

(22) PCT Filed: Feb. 8, 2007

(86) PCT No.: PCT/IB2007/050418
§ 371 (c)(1),
(2), (4) Date: Jan. 13, 2009

(87) PCT Pub. No.: WO2007/096801
PCT Pub. Date: Aug. 30, 2007

(65) Prior Publication Data
US 2009/0237299 A1    Sep. 24, 2009

(30) Foreign Application Priority Data
Feb. 23, 2006 (EP) .................. 06110363

(51) Int. Cl.
*H04N 5/76*    (2006.01)
*H04N 5/225*    (2006.01)
(52) U.S. Cl. .............. 348/231.3; 348/207.99

(58) Field of Classification Search ............. 348/231.3
See application file for complete search history.

(56) References Cited

U.S. PATENT DOCUMENTS

| | | | |
|---|---|---|---|
| 6,269,446 B1 | 7/2001 | Schumacher et al. | |
| 7,007,243 B2 * | 2/2006 | Baldino | 715/853 |
| 7,236,596 B2 * | 6/2007 | Prokoski | 380/258 |
| 7,619,662 B2 * | 11/2009 | Yule et al. | 348/231.3 |
| 7,719,467 B2 * | 5/2010 | Norda et al. | 342/357.31 |
| 7,719,576 B2 * | 5/2010 | Abraham et al. | 348/222.1 |
| 7,898,579 B2 * | 3/2011 | Yule et al. | 348/231.3 |
| 2001/0010549 A1 | 8/2001 | Miyake | |
| 2002/0054223 A1 * | 5/2002 | Spriggs | 348/232 |

(Continued)

FOREIGN PATENT DOCUMENTS
EP   1 189 021 A1   3/2002
(Continued)

OTHER PUBLICATIONS

*DIG 35 Specification—Metadata for Digital Images*, Version 1.0, Digital Imaging Group, Inc., Aug. 30, 2000.
(Continued)

*Primary Examiner* — Ngoc-Yen Vu
(74) *Attorney, Agent, or Firm* — Blakely, Sokoloff, Taylor & Zafman

(57) ABSTRACT

A method of creating an image file and a digital camera for the same. The method comprised the steps of: (i) generating and storing image data corresponding to a photo or video clip; (ii) sampling received GPS signals and storing the resultant GPS signal samples (hereafter "raw GPS data"); and (iii) creating a single file containing both the image data and the raw GPS data.

4 Claims, 1 Drawing Sheet

U.S. PATENT DOCUMENTS

| | | | |
|---|---|---|---|
| 2004/0042634 A1* | 3/2004 | Cazier | 382/100 |
| 2004/0201751 A1* | 10/2004 | Bell et al. | 348/231.99 |
| 2005/0272726 A1 | 12/2005 | Konetzki et al. | |
| 2006/0031263 A1* | 2/2006 | Arrouye et al. | 707/200 |
| 2006/0187317 A1* | 8/2006 | Montulli et al. | 348/231.5 |
| 2006/0208943 A1* | 9/2006 | Gronemeyer | 342/357.12 |

FOREIGN PATENT DOCUMENTS

| | | |
|---|---|---|
| JP | 2004-254131 A | 9/2004 |
| JP | 2006-033353 | 2/2006 |
| WO | WO 2004/090903 A1 | 10/2004 |
| WO | WO 2005/125183 A2 | 12/2005 |
| WO | WO 2006/102033 A1 | 9/2006 |

OTHER PUBLICATIONS

*JEITA CP-3451 Exchangeable Image File Format for Digital Still Cameras: Exif Version 2.2* Technical Standardization Committee on AV & IT Storage Systems and Equipment, Japan Electronics and Information Technology Industries Association, Apr. 2002.

*ISO/IEC 15444-2 Information Technology—JPEG 2000 Image Coding System: Extensions*, First Edition, ISO/IEC, May 15, 2004.

\* cited by examiner

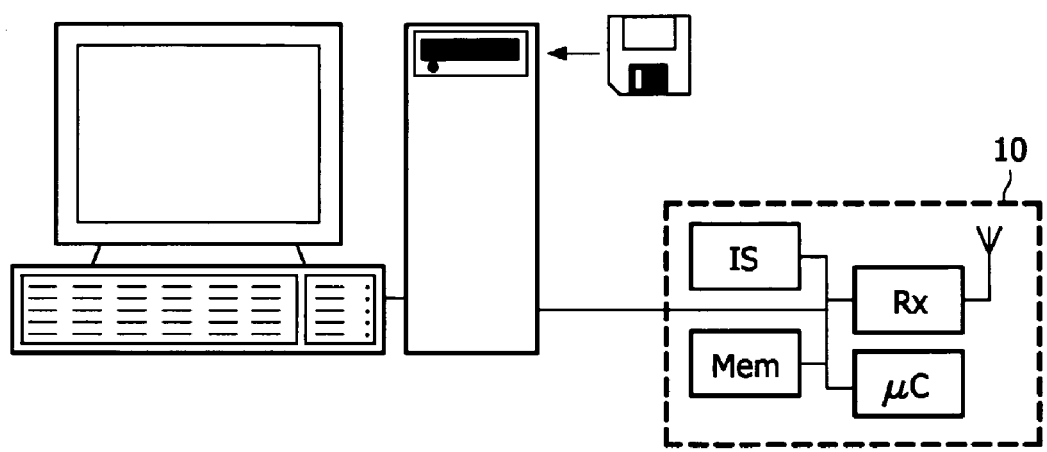

METHOD OF CREATING AN IMAGE FILE WITH COMBINED IMAGE DATA AND RAW GPS DATA AND A DIGITAL CAMERA FOR THE SAME

The present patent application is a Utility claiming the benefit of Application No. PCT/IB2007/050418, filed Feb. 8, 2007.

FIELD OF THE INVENTION

This invention relates to a method of creating an image file and a digital camera for the same. cl BACKGROUND It is known to provide a digital camera having a GPS receiver wherein image files generated by the digital camera are annotated or labelled with data identifying the position of the camera at the time of capture as determined by the GPS receiver. For example, see U.S. Pat. No. 6,269,446 or European patent application EP1189021A1.

PCT published patent application WO2004/090903A1 discloses a method of appending a position stamp to an image file of a photo or video clip taken with a digital camera having a GPS antenna and a GPS RF front-end including an analogue to digital converter for receiving GPS signals and outputting GPS signal samples. The method comprising the steps of: (i) upon a user taking a photo or video clip: (a) creating an image file containing that photo or video clip, and (b) sampling received GPS signals and storing those GPS signal samples with an indication of the image file of the photo or video clip to which those GPS signal samples pertain; and (ii) subsequently processing the GPS signal samples to obtain a position fix and appending the position fix to the image file.

The inventors of WO2004/090903A1 realised that storing GPS signal samples with an indication of the image file of the photo or video clip to which those GPS signal samples pertain enables those GPS signal samples to be processed at leisure to determine a position fix and, thereafter, append a position stamp to the image file.

SUMMARY OF THE INVENTION

In accordance with the present invention, there is provided a method of creating an image file and a digital camera for the same. The method comprises the steps of: (i) generating and storing image data corresponding to a photo or video clip; (ii) sampling received GPS signals and storing the resultant GPS signal samples (hereafter "raw GPS data"); and (iii) creating a single file containing both the image data and the raw GPS data.

The present invention has all the benefits of the arrangement of WO2004/090903A1 but with simplified file handling because of the combined image data and raw GPS data in a single file.

BRIEF DESCRIPTION OF THE DRAWING

The present invention will now be described, by way of example only, with reference to the accompanying FIGURE which shows, schematically, a PC connected to a digital camera including GPS receiver device, both operating in accordance with the present invention.

DETAILED DESCRIPTION

Referring to the accompanying FIGURE, the PC is connected via a USB PC port and corresponding cable to a digital camera 10 which comprises a GPS front-end receiver (Rx) connected to a GPS antenna, an image sensor (IS) and memory (Mem), all under the control of a micro-controller μC.

When operative, the GPS receiver receives NAVSTAR SPS GPS signals through its antenna and pre-process them, typically by passive bandpass filtering in order to minimise out-of-band RF interference, preamplification, down conversion to an intermediate frequency (IF) and analogue to digital conversion. The IF signal remains modulated, still containing all the information from the available satellites. The resultant GPS signal samples are then stored in the memory (Mem).

In accordance with the present invention, the digital camera and PC may generate a position stamped image file as illustrated in any of the following example scenarios:

EXAMPLE 1

Upon a user in possession of the camera taking a photo, an image file containing that photo is created and stored in the memory. At the same time, the GPS receiver receives and samples GPS signals and stores the resultant GPS signal samples in memory prior to appending this raw GPS data to the image file. Typically, such raw GPS data might be in the order of 200 kB.

It would of course be desirable to implement the present invention with present day digital image standards. Specifically in relation to the "Exchangeable image file format for digital still cameras: Exif Version 2.2" established by Standard of Japan Electronics and Information Technology Industries Association (JEITA CP-3451), to accommodate several hundred kilobytes of data, one could place the raw GPS data in a data field of unspecified length. For example, referring to the GPS Attribute Information in table 12 of the Exif Version 2.2 standard, one could use the GPSSatellites, GPS MapDatum, GPSProcessingMethod or GPSAreaInformation fields (the latter two being of currently unspecified data type), all of which are off unspecified length. Alternatively, a non-GPS related field could be used. Perhaps in a later version of the EXIF standard, a dedicated data field could be provided.

Such data could also be superimposed on the image, e.g. as a new lower layer of spatial encoding although it is noteworthy that the pseudorandom nature of the data means that such data might be lost were it subjected to lossy compression. But the method would be of use if the image was not subjected to further compression (e.g. flagged accordingly until the GPS data had been processed) or used in a format in which lossless compression was subsequently applied.

Once the user returns home and connects the digital camera to the user's home PC, the image file with corresponding GPS signal samples is uploaded to the PC. The GPS signal samples are copied from the image file and then processed using appropriate PC based GPS signal processing software and the PCs more powerful processor to recover pseudorange information from which the position of the digital camera when the corresponding photo was taken can be determined using conventional navigation algorithms. Such GPS signal acquisition and pseudorange processing is well known, for example, see GPS Principles and Applications (Editor, Kaplan) ISBN 0-89006-793-7 Artech House.

Upon successfully determining a position fix, the raw GPS data can be removed from the file and the file position stamped with the determined GPS position fix.

EXAMPLE 2

As example 1 except that the image file may be created at the same time with the raw GPS data.

Whilst the invention has been described in the context of NAVSTAR GPS, the all weather, spaced based navigation system developed and currently operated by the US Department of Defense, it will be appreciated that the invention is equally applicable to other global positioning systems including GLONASS and Galileo and hybrids thereof.

Finally, from a reading of the present disclosure, other modifications will be apparent to persons skilled in the arts of GPS and digital cameras which may involve features which are already known in the design, manufacture and use of GPS receivers, digital cameras and component parts thereof and which may be used instead of or in addition to features already described herein.

The invention claimed is:

1. A method of creating an image file comprising the steps of:
   (i) generating and storing image data corresponding to a photo or video clip;
   (ii) sampling received GPS signals and storing the resultant GPS signal samples (hereafter "raw GPS data"); and
   (iii) creating a single file containing both the image data and the raw GPS data.

2. A method according to claim 1 wherein step (iii) consists of first creating a file containing the image data and subsequently appending the raw GPS data to the file.

3. A digital camera comprising a GPS antenna and a GPS RF front-end; and
   wherein the camera is adapted, upon a user taking a photo or video clip, to
   (i) generate and store image data corresponding to a photo or video clip;
   (ii) sample received GPS signals and store the resultant GPS signal samples (hereafter "raw GPS data"); and
   (iii) to create a single file containing both the image data and the raw GPS data.

4. A camera according to claim 3 wherein, in step (iii), a file containing the image data is first created and the raw GPS data subsequently appended to the file.

* * * * *

UNITED STATES PATENT AND TRADEMARK OFFICE
CERTIFICATE OF CORRECTION

| | | |
|---|---|---|
| PATENT NO. | : 8,248,487 B2 | Page 1 of 1 |
| APPLICATION NO. | : 12/224353 | |
| DATED | : August 21, 2012 | |
| INVENTOR(S) | : Andrew T. Yule, Johan Peeters and Christopher B. Marshall | |

It is certified that error appears in the above-identified patent and that said Letters Patent is hereby corrected as shown below:

On Title page 2, Item (56), under U.S. Patent Documents, line 3, please delete "2005/0272726 A1 12/2005 Konetzki et al." and insert --2005/0275726 A1 12/2005 Abraham et al.--.

Signed and Sealed this
Fourth Day of December, 2012

David J. Kappos
*Director of the United States Patent and Trademark Office*